United States Patent [19]

Sheppard

[11] Patent Number: 4,796,831
[45] Date of Patent: Jan. 10, 1989

[54] MULTIPLIER FLY CASTING REEL WITH ANTI-REVERSING MECHANISM

[75] Inventor: William G. Sheppard, Ilion, N.Y.

[73] Assignee: Martin Automatic Fishing Reel Co., Inc., Mohawk, N.Y.

[21] Appl. No.: 109,076

[22] Filed: Oct. 16, 1987

[51] Int. Cl.⁴ ............................................. A01K 89/00
[52] U.S. Cl. ..................................... 242/212; 74/405; 242/217
[58] Field of Search ............... 242/211, 212, 213, 214, 242/215, 216, 220, 221; 254/345; 74/405

[56] References Cited

U.S. PATENT DOCUMENTS

| | | | |
|---|---|---|---|
| 283,496 | 8/1883 | Lang | 242/211 |
| 459,581 | 9/1891 | Hendryx | 242/220 |
| 1,574,719 | 2/1926 | White | 242/220 |
| 2,179,972 | 11/1939 | Adams | 242/211 |
| 4,461,435 | 7/1984 | Kovalovsky | 242/214 |

Primary Examiner—Stuart S. Levy
Assistant Examiner—Katherine Matecki
Attorney, Agent, or Firm—Wall and Roehrig

[57] ABSTRACT

A multiplier or multiple-action fly casting reel incorporates an anti-reverse mechanism so that when line is withdrawn from the reel, the crank handle becomes disengaged from the spool, but when withdrawal of line ceases, the handle and spool automatically reengage for rewind of the line. A multiplier gear assembly is mounted on a pivoted cluster bracket which is moved between engaged and disengaged positions by action of a one-way friction clutch associated with a spool. A spring returns the cluster bracket to the home position when there is no withdrawal of the line.

11 Claims, 2 Drawing Sheets

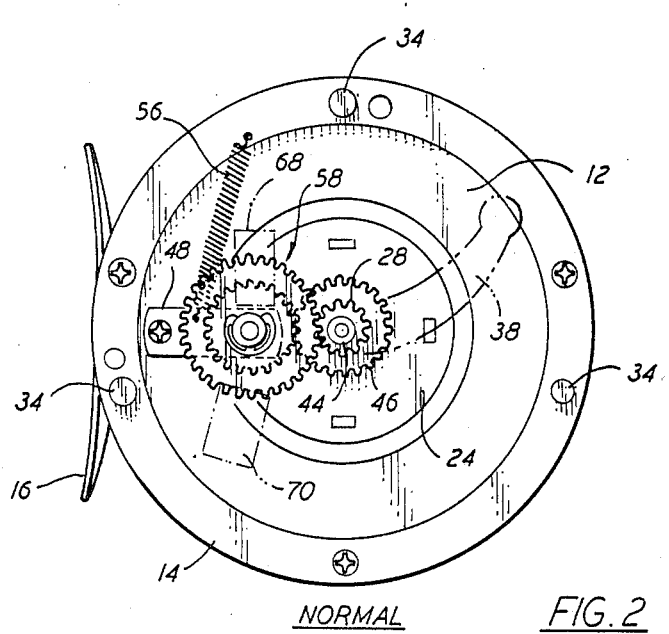
NORMAL  FIG. 2
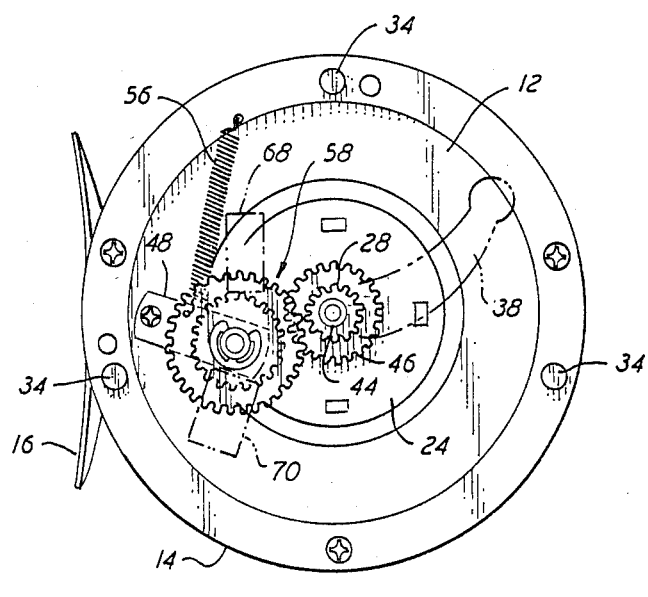
RUNNING  FIG. 3

MULTIPLIER FLY CASTING REEL WITH ANTI-REVERSING MECHANISM

BACKGROUND OF THE INVENTION

This invention relates to reels for use in fly casting, and is more particularly directed to improvements in multiplier-type fly reels.

In fly fishing, the purpose of the reel is to store the fly line and backing, and to retrieve the line. The reel plays no part in casting of the line, except to permit stripping out more line when needed. The reel is usually not used in a playing a fish, where the fish is over a pound or so. For most fish, once the fish takes the fly, the fisherman permits the fish to run against the drag imparted by the reel, until the fish tires out. Then the line is reeled in until the fish can be netted or until the fish attempts another run.

When fishing several varieties of fish, such as steelheads, salmon, muskellunge, bass and large trout (in the 2–6 pound range), the fish are expected to make very long runs. Open water conditions, the strength of the fish, and the fact that the drag must be set well below the breaking strength of the leader, which is usually only a few pounds, are factors that can lead the fish to running out large lengths of line. A long supply of backing line is needed here to prevent the fish from running out all the fly line and backing line and snapping the leader before tiring.

Multiplier fly reels are quite popular for the above conditions as they permit the line to be cranked in quickly, even after the fish has made an extremely long run. Multiplier reels are also favored where long casts are required, but where the line is reeled in between casts. Also, when a fish is running at the fisherman, it is important to reel in the line fast so that the line will not become slack enough for the fish to spit the fly out. Multiplier fly reels facilitate speedy line retrieval in such cases.

The fly fisherman will understand that a multiplier reel, or multiple action reel, is a fly reel in which the spool speed is faster than the crank handle speed, usually by a factor of from 2:1 to 4:1. In a direct-drive or single-action fly reel, on the other hand, the crank or handle and the spool turn at the same rate of speed.

A problem that multiple action fly reels have not addressed adequately is that a fish may begin its next run while the fisherman is reeling in his line. Ideally, the reel should sense this and disconnect the reel spool from the crank handle so the fish can pull against the drag of the reel, and tire itself. Then when the fish stops, the reel should sense this also to reengage the spool to the crank handle so the fisherman can wind in the line.

As with any other type of fly reel, the multiplier fly reel should accommodate interchangeable spools and should be field-convertible from right-hand to left-hand line retrieval.

A single-action reel was proposed in U.S. Pat. No. 4,461,435, which included disconnect means to permit the spool to rotate to the exclusion of the crank or handle when the line was tensioned. However, the concept of that patent relies on the direct-drive operation of the single action reel, and could not be carried over to a multiplier fly casting reel.

OBJECTS AND SUMMARY OF THE INVENTION

It is an object of this invention to provide an improved fly reel which automatically disengages the crank handle from the spool when a large fish has taken a fly and is "running" but will automatically engage for rewind of line when the fish ends its run.

It is a more specific object of this invention to provide such a feature in a multiplier or multiple-action fly reel, i.e., a fly reel whose line spool is multiplied so as to rotate faster than the crank handle, so that the line may be retrieved rapidly.

It is a further object of this invention to provide a multiplier fly reel with an anti-reverse handle mechanism which is simple and reliable, and which will not increase the weight or size of the reel.

In accordance with an aspect of this invention a multiplier fly casting reel is provided with a frame, a spool that holds the fly line plus backing, and a crank handle. The spool is rotatably mounted in the frame and a cover plate which journals the crank fits on the frame over one end of the spool. The crank has a drive gear which drives a pinion on the spool by means of a multiplier gear cluster that is supported between the cover plate and the spool. The cluster has a large gear that meshes with the crank drive gear and a small gear coaxial with the large gear that meshes with the spool pinion, with the effect that a single turn of the crank handle results in several rotations of the spool. The multiplier gear cluster is mounted in such fashion to permit limited movement of the cluster with respect to the crank gear and spool pinion, so that when there is tension on the fly line, and the line is being drawn from the spool, the cluster is moved out of engagement with the drive gear and spool pinion, but when the drawing out of line ceases, the cluster moves back into engagement with the drive gear and pinion so that the fisherman can retrieve the line by cranking the handle.

In a preferred embodiment, the multiplier gear cluster is mounted on a pivot plate and is biased into engagement by means of a spring. A one-way friction clutch associated with the spool engages the cluster pivot plate. Under normal modes (rewind or rest) the cluster is engaged with the drive gear and pinion, and the one-way clutch is in the free or slip mode. Then as line is drawn or stripped from the spool causing the spool to turn, the one-way clutch rotates and thus drives the pivot plate in the direction to disengage the multiplier gear cluster. The spool continues to slip frictionally with respect to the one-way clutch as line is drawn out, but the handle, being disengaged, does not turn. That is, by disengaging the gear cluster from the drive gear and spool pinion, there is no drive to the crank handle and no reverse spin. When stripping or drawing out of the line ceases, e.g., when a fish ceases its "run", the spool rotation stops, and the spring returns the pivot plate to its home position. Then the cluster engages the drive gear and pinion, and the fisherman can rewind the line.

The above and many other objects, features, and advantages of this invention will be appreciated from the ensuing description of a preferred embodiment, which is to be read in connection with the accompanying drawing.

BRIEF DESCRIPTION OF THE DRAWING

FIG. 2 is an axial section of the reel of FIG. 1 illustrating a normal, or engaged mode.

FIG. 3 is an axial section of the reel of FIG. 1 illustrating a running, or disengaged mode.

DETAILED DESCRIPTION OF A PREFERRED EMBODIMENT

Figures 1, 1A:
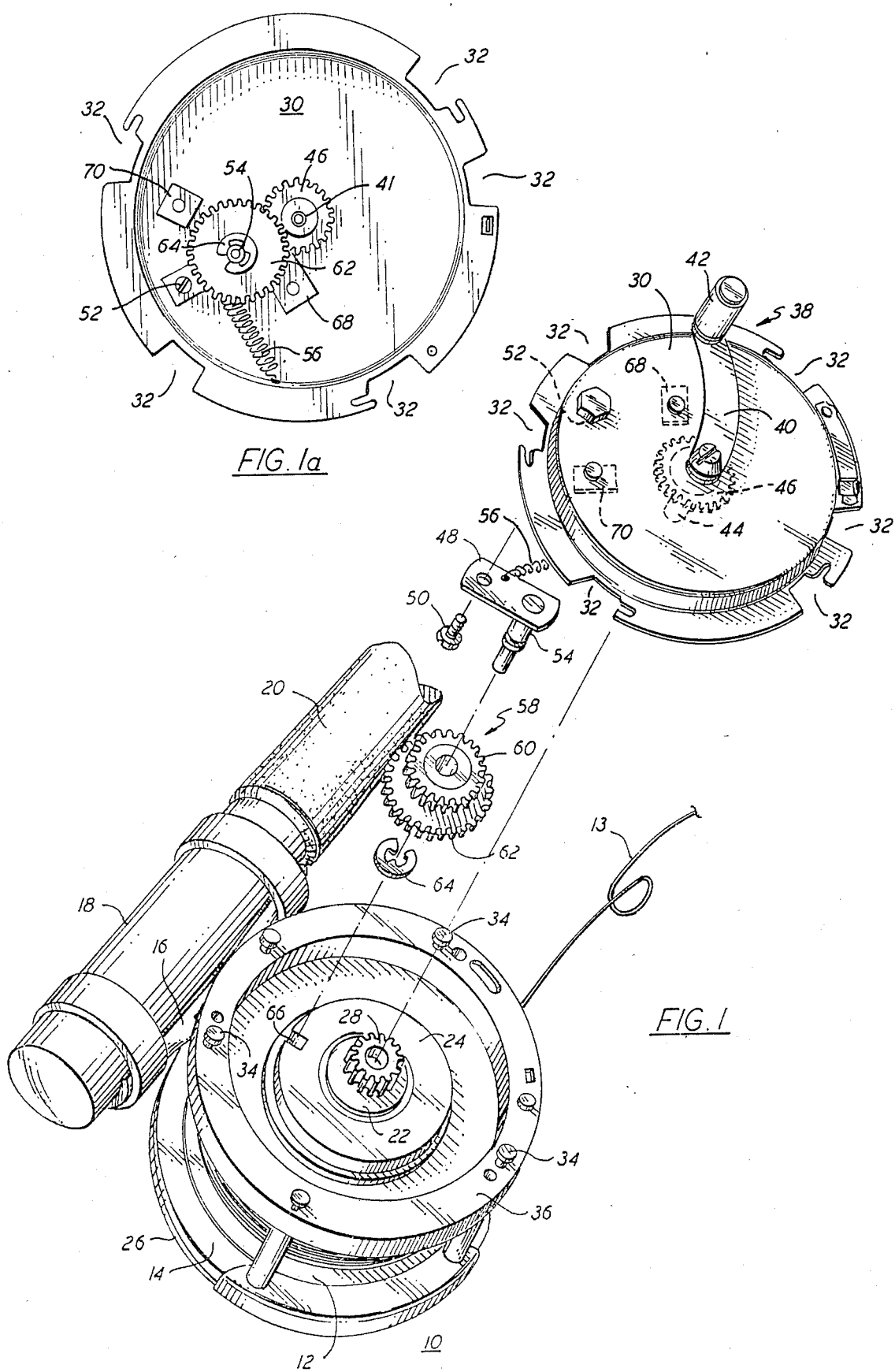
FIG. 1 is a perspective view, partly exploded, of a multiplier fly reel according to a preferred embodiment of this invention.
FIG. 1A is a plan view of the inside of the cover plate of the reel of FIG. 1.

With reference to the drawing and initially to FIG. 1 thereof, a multiplier fly casting reel 10 comprises a spool 12 on which a fly line 13 is wound. An open frame 14 holds the spool 12 so it can rotate about a mutual axis. The frame is attached by a reel seat 16 to a butt 18 of a fly rod 20. The spool 12 has a hub which fits over a frame shaft (not shown). A one-way slip plate 24 is mounted on the axis of the spool 12. This is of the type that is typically found is multiplier fly reels. The plate 24 rotates more or less freely in one direction, but imparts a frictional resistance in the other direction. In this embodiment the spool 12 rotates freely in the clockwise direction (as viewed in FIG. 1) if the plate 24 is held still, but encounters frictional resistance if rotated counterclockwise (i.e., as the line 13 is stripped from the reel 10.)

A back plate 26 attaches to the frame 14 on the opposite side of the spool 12 and this plate includes a drag knob (not shown) for adjusting pressure on a frictional drag plate which engages a one-way clutch on that side of the spool 12. This type of drag arrangement is well known and need not be shown or discussed here in detail.

A drive pinion 28 is attached to the hub 22 of the spool 12 and rotates with it.

A front cover plate 30 fits over the front axis of the spool 12 and removably mates to the frame 14. This cover plate 30 rotates on and off the frame 14 for quick interchange of spools. To this end, the cover plate 30 has a number of peripheral cutouts 32 which mate with projecting studs 34 carried on a mounting ring 36 of the frame 14.

A handle or crank 38 is journalled in the cover and has a crank arm 40 with a grip 42 at its free end, and a shaft 44 passing through the cover, on which is mounted a crank drive gear 46. An end of the shaft 44 fits into a recess in the pinion 28 to ensure alignment of the latter with the drive gear 46.

A multiplier gear assembly is formed on a cluster bracket or plate 48 which is pivotally mounted to the cover 30 by a pivot pin 50 which passes through one end of the cluster bracket 48 and through a hole 52 in the cover plate 30. Here, see also FIG. 1A. A stud 54 is mounted at the free end of the bracket 48 and a spring 56 biases the latter in the direction generally towards the drive gear 46. A multiplier gear cluster 58 is rotatably mounted on the stud 54 and is formed of coaxial first and second gears 60,62 that are affixed on each other. The smaller first gear 60 has the same number of teeth as the drive gear 46 and meshes with it. The second, larger gear 62 has a number of teeth equal to some multiple of the teeth of the spool pinion 28, so each revolution of the cluster gears 60,62 results in multiple revolutions of the pinion 28 and spool 12. In the illustrated embodiment, the tooth ratio of the gear 62 to the pinion 28 is about 3:1, but the ratio can be any desired ratio, although usually between 2:1 and 4:1. A split ring retainer 64 holds the multiplier gear cluster 58 on the stud 54. One end of the stud 54 projects beyond the area in which the retainer 64 fits; this end of the stud 54 mates with a recess 66 in the one-way slip clutch plate 24. The stud 54 is the only structure preventing free rotation of the clutch plate 24.

The cover plate 30 also carries first and second stops 68,70 which limit the swing of the cluster bracket 48 about its pivot pin 50.

The normal mode of the reel 10, i.e. rest or rewind, is shown in FIG. 2. Here the spring 56 urges the bracket 48 against the stop 68, and the sprocket gears 60 and 62 engage with the crank drive gear 46 and the spool pinion 28.

As the line 13 is withdrawn from the reel, the spool 12 turns counterclockwise, frictionally engaging the one-way slip plate 24 and driving it counterclockwise. The latter acts through the stud 54 to rotate the cluster bracket 48, with respect to the cover plate 30 and hence with respect to the frame 14, until the bracket lodges against the stop 70. In this position, the reel is in the running or free mode, shown in FIG. 3, in which the spool pinion 28 is out of engagement with the cluster 58, as is the crank drive gear 46. This disengages the spool 12 from the crank handle 38. As the line 13 continues to be withdrawn, no driving torque is provided to the handle 38, so it does not turn.

When withdrawal of the line 13 from the reel 10 ceases, spool rotation stops, and the force of the spring 56 overcomes the friction force imposed by the spool 12 onto the clutch plate 24. The spring 56 returns the cluster bracket 48 back to its home position against the stop 68. In this position, rotating the crank handle 38 rewinds the line 13 onto the spool 12.

The reel 10 of this embodiment permits ready interchange of spools, for example, if a fisherman desires to change from a level line to a double-taper line. The spool line capacity should be sufficient to accommodate a sufficient quantity of backing line as may be needed where a fish might make a long run. The mechanism as illustrated can be adapted so that the reel 10 is field interchangeable from right-hand to left-hand retrieve. While not illustrated here, such an adaptation would simply involve changing the direction of the spring 56 and the action of the plate 24, and moving the stop 68 out and the stop 70 in.

In alternative embodiments, instead of the crank handle illustrated here, the reel could employ a crank plate of the style commonly used in single action reels. Also, instead of the cluster gear step-up mechanism illustrated here, a planetary or other gearing mechanism could be used.

The parts of the reel can be of aluminum alloy or other light corrosion-resistant material, suitable for freshwater or saltwater use. The gears can be of brass or other metal, although tough and robust synthetic resins could be used to save on weight.

Although the multiplier fly reel of this invention has been described in detail with reference to a single preferred embodiment, it should be apparent that the invention is not limited to that embodiment; rather, many modifications and variations would be apparent to those skilled in the art without departure from the scope and spirit of this invention, as defined in the appended claims.

What is claimed is:

1. A multiplier fly casting reel comprising a spool for containing a length of fly fishing line; a frame rotatably mounting said spool; a cover mounted on said frame axially over one side of the spool; a manually rotatable crank journalled in said cover and having a crank gear affixed thereon; an axial drive pinion mounted at one side of said spool; a multiplier gear assembly disposed between the spool and the cover and engaging the spool drive pinion and the crank gear such that a single rotation of said crank results in more than one rotation of the spool; and means for mounting said multiplier gear assembly to permit limited movement thereof with respect to said crank gear and spool drive pinion including means for moving the multiplier gear assembly in response to spool rotation when said fly line is drawn out from said spool to disengage the crank from the spool so that the crank is not turned by the rotation of said spool, and means for automatically moving back the multiplier gear assembly for reengaging the crank with the spool to permit rewind of said line when drawing out of the line ceases.

2. The multiplier fly casting reel of claim 1 wherein said crank gear and spool drive pinion are situated at the spool axis, and said multiplier gear assembly includes a gear cluster composed of a larger gear that meshes with the spool drive pinion and a coaxial smaller gear that meshes with the crank gear.

3. A multiplier fly casting reel comprising a spool for containing a length of fly fishing line; a frame rotatably mounting said spool; a manually rotatable crank journalled in said cover and having a crank gear affixed thereon; axial drive pinion mounted at one side of said spool; a multiplier gear assembly disposed between the spool and the cover and engaging the spool drive pinion and the crank gear such that a single rotation of said crank results in more than one rotation of the spool; and means for mounting the multiplier gear assembly to permit limited movement thereof with respect to said crank gear and spool drive pinion, including means for moving the multiplier gear assembly when said fly line is drawn out from said spool to disengage the crank from the spool so that the crank is not turned by the rotation of said spool, and means for moving back the multiplier gear assembly for reengaging the crank with the spool to permit rewind of said line when the drawing out of the line ceases, wherein the crank gear and the spool drive pinion are situated at the spool axis, and said multiplier gear assembly includes a gear cluster composed of a larger gear that meshes with the spool drive pinion and a coaxial smaller gear that meshes with the crank gear, and wherein said multiplier gear assembly mounting means includes a mounting bracket containing a stud on which said cluster is rotationally mounted, and a pivot spaced from said stud and pivotally mounting the bracket with respect to said frame.

4. The multiplier fly casting reel of claim 3 wherein said multiplier gear assembly mounting means includes a pair of stops which limit travel of said bracket in the directions towards and away from engagement.

5. The multiplier fly casting reel of claim 3 wherein said spool includes a one-way slip drag plate on said one side of the spool, and said mounting bracket includes means coacting with said slip drag plate for urging said cluster out of engagement with one or both of said spool pinion and crank gear when the spool is rotated in the direction to unwind the line from the spool.

6. The multiplier fly casting reel of claim 5 wherein said multiplier gear assembly mounting means further includes resilient means normally urging said bracket into the position in which the cluster engages said spool pinion and said crank gear.

7. The multiplier fly casting reel of claim 5 wherein said slip drag plate has a recess formed therein, and said mounting bracket stud extends into said recess.

8. The multiplier fly casting reel of claim 7 wherein said slip drag plate is held against rotation relative to said frame only by the mounting bracket stud.

9. In a multiple-action fly casting reel of the type in which a spool is mounted on a frame and contains a supply of line which can be withdrawn and wound in, and a crank handle is rotatable to rotate the spool, with a gearing mechanism that comprises a crank gear that is affixed to the crank handle, a pinion that is mounted on the spool at its axis, and a multiplier gear assembly that rotates the spool pinion in response to rotation of the crank gear; the improvement which comprises an anti-reverse mechanism for the handle including means responsive to the withdrawal of said line from said spool to move the multiplier gear assembly out of engagement with at least one of said pinion and said crank gear for disengaging the spool from the crank handle while the line is being drawn out, and means for automatically returning said multiplier gear assembly into engagement to reengage the crank handle and spool when withdrawal of the line ceases.

10. A multiple-action fly casting reel according to claim 9 wherein said multiplier gear assembly includes a pivoted bracket which swings between an engaged and a disengaged position of the multiplier gear assembly with respect to the pinion and crank gear, a spring biasing said bracket to its engaged position, and means for urging said bracket to its disengaged position in response to rotation of the spool in one predetermined direction.

11. A multiple-action fly casting reel according to claim 10 wherein said means for urging said bracket to its disengaged position includes a one-way friction plate mounted on said spool and coupled to said bracket, said plate applying substantial resistance to rotation of said spool in said one direction, but permitting substantially free rotation in an opposite direction.

* * * * *